US011083997B2

(12) United States Patent
Roderick et al.

(10) Patent No.: US 11,083,997 B2
(45) Date of Patent: Aug. 10, 2021

(54) NON-NESTING, NON-DEFORMING PATTERNS FOR SPIRAL-WOUND ELEMENTS

(71) Applicant: Aqua Membranes LLC, Albuquerque, NM (US)

(72) Inventors: Kevin Roderick, Albuquerque, NM (US); Rodney Herrington, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 13 days.

(21) Appl. No.: 16/074,057

(22) PCT Filed: Apr. 12, 2018

(86) PCT No.: PCT/US2018/027367
§ 371 (c)(1),
(2) Date: Jul. 30, 2018

(87) PCT Pub. No.: WO2018/194911
PCT Pub. Date: Oct. 25, 2018

(65) Prior Publication Data
US 2021/0031145 A1 Feb. 4, 2021

Related U.S. Application Data

(60) Provisional application No. 62/487,970, filed on Apr. 20, 2017.

(51) Int. Cl.
*B01D 63/10* (2006.01)
*B01D 69/02* (2006.01)

(52) U.S. Cl.
CPC ............. *B01D 63/10* (2013.01); *B01D 69/02* (2013.01); *B01D 2313/143* (2013.01); *B01D 2325/08* (2013.01)

(58) Field of Classification Search
None
See application file for complete search history.

(56) References Cited

U.S. PATENT DOCUMENTS

| | | |
|---|---|---|
| 3,963,621 A | 6/1976 | Newman |
| 4,187,173 A | 2/1980 | Keefer |
| 4,208,289 A | 6/1980 | Bray |
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |

(Continued)

FOREIGN PATENT DOCUMENTS

| | | |
|---|---|---|
| CA | 2662925 A1 | 1/2009 |
| CA | 2825674 C | 8/2011 |

(Continued)

*Primary Examiner* — Ryan B Huang
(74) *Attorney, Agent, or Firm* — V Gerald Grafe

(57) ABSTRACT

Embodiments of the present invention provide for the deposition of spacing elements for spiral wound elements that prevent nesting of adjacent spacer layers and occlusion of feed space during element rolling.

16 Claims, 3 Drawing Sheets

(56) References Cited

U.S. PATENT DOCUMENTS

| | | | |
|---|---|---|---|
| 4,842,736 | A | 6/1989 | Bray |
| 4,844,805 | A | 7/1989 | Solomon |
| 4,855,058 | A | 8/1989 | Holland et al. |
| 4,856,559 | A | 8/1989 | Lipshultz et al. |
| 4,869,821 | A | 9/1989 | Korin |
| 4,874,514 | A | 10/1989 | Casey, Jr. |
| 4,876,002 | A | 10/1989 | Marshall et al. |
| 4,877,521 | A | 10/1989 | Petrucci et al. |
| 4,882,061 | A | 11/1989 | Petrucci et al. |
| 4,882,223 | A | 11/1989 | Aptel et al. |
| RE33,135 | E | 12/1989 | Wanner, Sr. et al. |
| 4,885,092 | A | 12/1989 | Zwick |
| 4,886,597 | A | 12/1989 | Wild et al. |
| 4,892,657 | A | 1/1990 | Mohn et al. |
| 4,902,417 | A | 2/1990 | Lien |
| 4,906,372 | A | 3/1990 | Hopkins |
| 4,917,847 | A | 4/1990 | Solomon |
| 4,937,557 | A | 6/1990 | Tucci et al. |
| 4,944,877 | A | 7/1990 | Maples |
| 4,988,525 | A | 1/1991 | Gresch |
| 4,990,248 | A | 2/1991 | Brown et al. |
| 4,992,170 | A | 2/1991 | Menon et al. |
| 4,995,977 | A | 2/1991 | Hilgendorff et al. |
| 5,002,664 | A | 3/1991 | Clack et al. |
| 5,017,284 | A | 5/1991 | Miler et al. |
| 5,043,066 | A | 8/1991 | Miller et al. |
| 5,045,197 | A | 9/1991 | Burrows |
| 5,057,212 | A | 10/1991 | Burrows |
| 5,069,789 | A | 12/1991 | Mohn et al. |
| 5,078,876 | A | 1/1992 | Whittier et al. |
| 5,094,749 | A | 3/1992 | Seita et al. |
| 5,096,574 | A | 3/1992 | Birdsong et al. |
| 5,104,532 | A | 4/1992 | Thompson et al. |
| 5,108,604 | A | 4/1992 | Robbins |
| 5,128,035 | A | 7/1992 | Clack et al. |
| 5,131,277 | A | 7/1992 | Birdsong et al. |
| 5,132,017 | A | 7/1992 | Birdsong et al. |
| 5,145,575 | A | 9/1992 | Burrows |
| 5,167,786 | A | 12/1992 | Eberle |
| 5,167,826 | A | 12/1992 | Eaton |
| 5,183,567 | A | 2/1993 | Mohn et al. |
| 5,194,156 | A | 3/1993 | Tomchak |
| 5,198,110 | A | 3/1993 | Hanai et al. |
| 5,204,002 | A | 4/1993 | Belfort et al. |
| 5,232,591 | A | 8/1993 | Solomon |
| 5,234,583 | A | 8/1993 | Cluff |
| 5,240,612 | A | 8/1993 | Grangeon et al. |
| 5,279,732 | A | 1/1994 | Edens |
| 5,296,148 | A | 3/1994 | Colangelo et al. |
| 5,354,464 | A | 10/1994 | Slovak et al. |
| 5,362,383 | A | 11/1994 | Zimmerman et al. |
| 5,462,414 | A | 10/1995 | Permar |
| 5,466,366 | A | 11/1995 | Chia-ching |
| 5,468,387 | A | 11/1995 | Solomon |
| 5,507,943 | A | 4/1996 | Labrador |
| RE35,252 | E | 5/1996 | Clack et al. |
| 5,545,320 | A | 8/1996 | Heine et al. |
| 5,573,662 | A | 11/1996 | Abe et al. |
| 5,597,487 | A | 1/1997 | Vogel et al. |
| 5,626,752 | A | 5/1997 | Mohn et al. |
| 5,626,758 | A | 5/1997 | Belfort |
| 5,628,198 | A | 5/1997 | Permar |
| 5,681,459 | A | 10/1997 | Bowman |
| 5,681,467 | A | 10/1997 | Solie et al. |
| 5,788,858 | A | 8/1998 | Acernese et al. |
| 5,795,475 | A | 8/1998 | Luedke et al. |
| 5,811,251 | A | 9/1998 | Hirose et al. |
| 5,824,217 | A | 10/1998 | Pearl et al. |
| 5,914,041 | A | 6/1999 | Chancellor |
| 5,944,985 | A | 8/1999 | Bowman |
| 5,985,146 | A | 11/1999 | Knappe et al. |
| 6,030,535 | A | 2/2000 | Hayashi et al. |
| 6,071,404 | A | 6/2000 | Tsui |
| 6,071,414 | A | 6/2000 | Kishi |
| 6,099,735 | A | 8/2000 | Kelada |
| 6,109,029 | A | 8/2000 | Vowles et al. |
| 6,110,360 | A | 8/2000 | Hart, Jr. |
| 6,117,297 | A | 9/2000 | Goldstein |
| 6,120,682 | A | 9/2000 | Cook |
| 6,126,833 | A | 10/2000 | Stobbe et al. |
| 6,174,437 | B1 | 1/2001 | Haney |
| 6,190,557 | B1 | 2/2001 | Hisada et al. |
| 6,193,879 | B1 | 2/2001 | Bowman |
| 6,197,191 | B1 | 3/2001 | Wobben |
| 6,217,773 | B1 | 4/2001 | Graham |
| 6,258,270 | B1 | 7/2001 | Hilgendorff et al. |
| 6,277,282 | B1 | 8/2001 | Kihara et al. |
| 6,299,766 | B1 | 10/2001 | Permar |
| 6,345,961 | B1 | 2/2002 | Oklejas, Jr. |
| 6,348,148 | B1 | 2/2002 | Bosley |
| 6,379,518 | B1 | 4/2002 | Osawa et al. |
| 6,379,548 | B1 | 4/2002 | Kurokawa et al. |
| 6,383,384 | B1 | 5/2002 | Anderson |
| RE37,759 | E | 6/2002 | Belfort |
| 6,402,956 | B1 | 6/2002 | Andou et al. |
| 6,423,212 | B1 | 7/2002 | Bosko |
| 6,423,223 | B1 | 7/2002 | Northcut et al. |
| 6,432,301 | B1 | 8/2002 | Dengler |
| 6,436,282 | B1 | 8/2002 | Gundrum et al. |
| 6,447,259 | B2 | 9/2002 | Elliott-Moore |
| 6,514,398 | B2 | 2/2003 | DiMascio et al. |
| 6,521,124 | B2 | 2/2003 | Northcut et al. |
| 6,521,127 | B1 | 2/2003 | Chancellor |
| 6,524,478 | B1 | 2/2003 | Heine et al. |
| 6,540,915 | B2 | 4/2003 | Patil |
| 6,575,308 | B1 | 6/2003 | Fuls et al. |
| 6,579,451 | B1 | 6/2003 | Avero |
| 6,607,668 | B2 | 8/2003 | Rela |
| 6,613,231 | B1 | 9/2003 | Jitariouk |
| 6,632,357 | B1 | 10/2003 | Barger et al. |
| 6,790,345 | B2 | 9/2004 | Broussard |
| 6,805,796 | B2 | 10/2004 | Hirose et al. |
| 6,830,683 | B2 | 12/2004 | Gundrum et al. |
| 6,866,831 | B2 | 3/2005 | Nakao et al. |
| 6,881,336 | B2* | 4/2005 | Johnson ................. B01D 63/10 210/321.74 |
| 6,929,743 | B2 | 8/2005 | Diel |
| 6,929,748 | B2 | 8/2005 | Avijit et al. |
| 7,021,667 | B2 | 4/2006 | Campbell et al. |
| 7,186,331 | B2 | 3/2007 | Maartens et al. |
| 7,244,357 | B2 | 7/2007 | Herrington et al. |
| 7,297,268 | B2 | 11/2007 | Herrington et al. |
| 7,306,437 | B2 | 12/2007 | Hauge |
| 7,311,831 | B2 | 12/2007 | Bradford et al. |
| 7,341,663 | B2 | 3/2008 | Offeman |
| 7,351,335 | B2 | 4/2008 | Broens et al. |
| 7,387,725 | B2 | 6/2008 | Choi et al. |
| 7,416,666 | B2 | 8/2008 | Gordon |
| 7,449,093 | B2 | 11/2008 | Dudziak et al. |
| 7,455,778 | B2 | 11/2008 | Gordon |
| 7,501,064 | B2 | 3/2009 | Schmidt et al. |
| 7,514,010 | B2 | 4/2009 | Salmon |
| 7,520,981 | B2 | 4/2009 | Barber |
| 7,540,956 | B1 | 6/2009 | Kurth et al. |
| 7,650,805 | B2 | 1/2010 | Nauseda et al. |
| 7,733,459 | B2 | 6/2010 | Dierichs et al. |
| 7,736,503 | B2 | 6/2010 | Kennedy et al. |
| 7,862,723 | B2 | 1/2011 | Cartwright |
| 7,875,184 | B2 | 1/2011 | Parker et al. |
| 7,892,429 | B2 | 2/2011 | Oklejas, Jr. |
| 7,901,580 | B2 | 3/2011 | Salyer |
| 7,909,998 | B2 | 3/2011 | Kennedy et al. |
| 7,910,004 | B2 | 3/2011 | Cohen et al. |
| 7,927,082 | B2 | 4/2011 | Haudenschild |

(56) References Cited

U.S. PATENT DOCUMENTS

| | | | |
|---|---|---|---|
| 7,981,293 B2 | 7/2011 | Powell | |
| 8,021,550 B2 | 9/2011 | Beauchamp et al. | |
| 8,101,074 B2 | 1/2012 | Larsen | |
| 8,114,286 B2 | 2/2012 | Kawakami | |
| 8,147,699 B2 | 4/2012 | Goldsmith | |
| 8,257,594 B2 | 9/2012 | Astle et al. | |
| 8,282,823 B2 | 10/2012 | Acernese et al. | |
| 8,292,088 B2 | 10/2012 | Francisco et al. | |
| 8,292,492 B2 | 10/2012 | Ho et al. | |
| 8,414,767 B2 | 4/2013 | Gaignet et al. | |
| 8,425,734 B2 | 4/2013 | Goel et al. | |
| 8,454,829 B2 | 6/2013 | Yaeger | |
| 8,506,685 B2 | 8/2013 | Taylor et al. | |
| 8,518,225 B2 | 8/2013 | Sumita et al. | |
| 8,628,642 B2 | 1/2014 | Goel et al. | |
| 8,652,326 B2 | 2/2014 | Johann et al. | |
| 8,685,252 B2 | 4/2014 | Vuong et al. | |
| 8,696,904 B2 | 4/2014 | Thiyagarajan et al. | |
| 8,771,510 B2 | 7/2014 | Takahashi et al. | |
| 8,778,055 B2 | 7/2014 | Taylor et al. | |
| 8,808,538 B2 | 8/2014 | Oklejas, Jr. | |
| 8,889,009 B2 | 11/2014 | Brausch et al. | |
| 8,944,257 B2 | 2/2015 | Eisen et al. | |
| 8,961,790 B2 | 2/2015 | Beauchamp et al. | |
| 8,968,566 B2 | 3/2015 | Beauchamp et al. | |
| 8,999,162 B2 | 4/2015 | Vuong et al. | |
| 9,011,664 B2 | 4/2015 | Takahashi et al. | |
| 9,011,688 B2 | 4/2015 | Takahashi et al. | |
| 9,108,162 B2 | 8/2015 | Takahashi et al. | |
| 9,114,365 B2 | 8/2015 | Schmitt | |
| 9,260,325 B2 | 2/2016 | Takahashi et al. | |
| 9,328,743 B2 | 5/2016 | Hirosawa et al. | |
| 9,375,683 B2 | 6/2016 | Danisco | |
| 9,387,445 B2 | 7/2016 | Kimura et al. | |
| 9,403,125 B2 | 8/2016 | Shaffer | |
| 9,475,008 B2 | 10/2016 | Salama et al. | |
| 9,492,792 B2 | 11/2016 | Tomescu et al. | |
| 9,546,671 B2 | 1/2017 | Hirosawa et al. | |
| 9,597,640 B2 | 3/2017 | Koiwa et al. | |
| 9,616,390 B2 | 4/2017 | Hirozawa et al. | |
| 9,617,172 B1 | 4/2017 | Baski | |
| 9,724,646 B2 | 8/2017 | Okamoto et al. | |
| 9,731,984 B2 | 8/2017 | Beall | |
| 9,758,389 B2 | 9/2017 | Rau, III | |
| 9,764,291 B2 | 9/2017 | Hirozawa et al. | |
| 9,808,767 B2 | 11/2017 | Tabayashi et al. | |
| 2003/0024868 A1 | 2/2003 | Hallan | |
| 2008/0290031 A1 | 11/2008 | Popa | |
| 2012/0018366 A1 | 1/2012 | Buser | |
| 2012/0298578 A1 | 11/2012 | Herrington | |
| 2013/0146532 A1* | 6/2013 | Dontula | B29C 53/24 210/541 |
| 2013/0334128 A1* | 12/2013 | Takagi | B01D 63/103 210/457 |
| 2016/0008763 A1 | 1/2016 | Roderick et al. | |
| 2016/0236132 A1 | 8/2016 | Hara et al. | |

FOREIGN PATENT DOCUMENTS

| | | |
|---|---|---|
| EP | 2902094 | 8/2015 |
| JP | 2015006661 A * | 1/2015 |
| JP | 2017029912 A * | 2/2017 |
| WO | WO2010047360 A1 | 4/2010 |
| WO | WO2015016253 A1 | 2/2015 |
| WO | WO2002/055179 | 8/2015 |
| WO | WO2016199272 A1 | 12/2016 |
| WO | WO2017087461 A1 | 5/2017 |

* cited by examiner

NON-NESTING, NON-DEFORMING PATTERNS FOR SPIRAL-WOUND ELEMENTS

CROSS-REFERENCE TO RELATED APPLICATIONS

This application is a national stage application under 35 U.S.C. 371 of PCT application PCT/US2018/027367, filed 12 Apr. 2018, which claims priority to U.S. provisional application 62/487,970, filed 20 Apr. 2017. Each of the foregoing is incorporated by reference herein.

TECHNICAL FIELD

The subject invention relates to a permeable membrane system utilized for the separation of fluid components, specifically spiral-wound permeable membrane elements.

BACKGROUND ART

Spiral-wound membrane filtration elements known in the art comprise a laminated structure including a membrane sheet sealed to or around a porous permeate carrier which creates a path for removal of the fluid passing through the membrane to a central tube, while this laminated structure is wrapped spirally around the central tube and spaced from itself with a porous feed spacer to allow axial flow of the fluid through the element. While this feed spacer is necessary to maintain open and uniform axial flow between the laminated structure, it is also a source of flow restriction and pressure drop within the axial flow channel and also presents areas of restriction of flow and contact to the membrane that contribute significantly to membrane fouling via biological growth, scale formation, and particle capture.

Improvements to the design of spiral wound elements have been disclosed by Barger et al. and Bradford et al., which replace the feed spacer with islands or protrusions either deposited or embossed directly onto the outside or active surface of the membrane. This configuration is advantageous in that it maintains spacing for axial flow through the element while minimizing obstruction within the flow channel. It also eliminates the porous feed spacer as a separate component, thus simplifying element manufacture. Patent publication number US2016-0008763-A1, entitled "Improved Spiral Wound Element Construction" teaches the application of printed patterns on the back side of the active surface of the membrane sheet, or directly on the surface of the permeate carrier.

The following references, each of which is incorporated herein by reference, can facilitate understanding of the invention: U.S. Pat. Nos. 3,962,096; 4,476,022; 4,756,835; 4,834,881; 4,855,058; 4,902,417; 4,861,487; 6,632,357; and US application 2016-0008763-A1.

DISCLOSURE OF INVENTION

Embodiments of the present invention provide a membrane for use in a spiral wound permeable membrane system, comprising a membrane having spacing features disposed on a surface of the membrane, wherein the spacing features are configured such that they discourage nesting of the spacers when spirally wound. The spacing features can be disposed such that they overlap when the membrane is spirally wound.

In some embodiments, the spacing features can comprise a plurality of substantially parallel line segments spaced apart from each other by nonuniform spacing distances. A first subset of the plurality of line segments can be spaced apart from each other by nonuniform spacing distances thereby forming a pattern, and wherein other subsets of the plurality of line segments comprise repeats of the pattern. The first subset can extend over at least 6 inches measured from the first line segment to the last line segment. The first subset can extend over at least 12 inches measured from the first line segment to the last line segment. The variation in spacing can be less than 15% of the average distance between adjacent spacing features.

In some embodiments, the spacing features can comprise a plurality of line segments spaced apart from each other and oriented non-parallel to each other at nonuniform angles. A first subset of the plurality of line segments can be oriented relative to each other at nonuniform angles thereby forming a pattern, and wherein other subsets of the plurality of line segments comprise repeats of the pattern. The pattern can extend for at least 6 inches measured from the first line segment to the last line segment. The pattern can extend for at least 12 inches measured from the first line segment to the last line segment. The variation in angle can be less than 15% of the average angle of the features relative to the pattern.

In some embodiments, the spacing features can comprise a first plurality of line segments parallel to each other and disposed in a first grid on the surface, and a second plurality of line segments parallel to each other and disposed in a second grid on the surface, wherein the line segments in the first plurality do not intersect the line segments in the second plurality, and wherein the line segments in the first plurality are disposed at an angle other than zero degrees to the line segments in eh second plurality. The angle can be at least 1 degree but not more than 45 degrees. The angle can be 45 degrees. Each spacing feature in the first plurality can be separated from adjacent spacing features in the first plurality by no more than one quarter of an inch. Each spacing feature in the first plurality can be separated from adjacent spacing features in the first plurality by no more than one tenth of an inch.

In some embodiments, the spacing features can comprise a plurality of curved segments that are spaced apart from each other by nonuniform spacing distances measured as determined along at least one path traversing the spacing features.

In some embodiments, the spacing features can be configured such that the spacing features at least partly support those spacing features on adjacent layers as the membrane is manufactured into the permeable membrane system.

In some embodiments, the spacing features can be disposed proximal the edges of the membrane.

In some embodiments, the spacing features can be disposed on the entirety of the surface of the membrane.

In some embodiments, the spacing features can be more closely spaced near the edges of the membrane than in portions of the membrane distant from the edges. The edges of the membrane can be defined as the region within three inches of the edge of the membrane. The edges of the membrane can be defined as the region within one inch of the edge of the membrane.

In some embodiments, the spacing features can be made of one or more of thermoplastics, reactive polymers, waxes, or resins; deposited directly onto the membrane surface.

In some embodiments, the spacing features can be made of one or more of high-temperature thermoplastics, metals, or ceramics; formed apart from the membrane surface and then adhered to the membrane surface.

Embodiments of the present invention provide a permeable membrane system comprising a membrane as described herein.

Embodiments of the present invention provide a water treatment facility comprising one or more permeable membrane systems as described herein.

Embodiments of the present invention provide a method of treating water, comprising providing a permeable membrane system as described herein, and passing water to be treated through the permeable membrane system.

Embodiments of the present invention provide a method of making a permeable membrane system, comprising providing a membrane as described herein, and spirally winding the membrane.

MODES FOR CARRYING OUT THE INVENTION AND INDUSTRIAL APPLICABILITY

Figure 2:
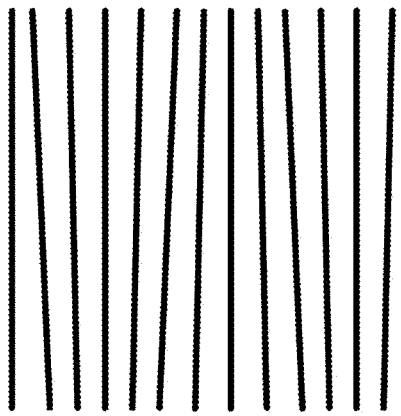
FIG. 2 is an illustration of an array of line segments at various angles to prevent nesting during rolling of a spiral-wound element.

Embossing or depositing features onto the surface of the membrane sheet, or onto or into the permeate carrier sheet of a spiral-wound element to provide spacing between adjacent membrane sheets can provide several advantages as compared to feed spacer mesh, including more open flow channels, lower pressure drop, reduced fouling, and the ability to produce thinner feed space than would be practical using a mesh. The membrane sheet itself can be made with a porous layer of polypropylene, bonded to a porous layer of polysulfone, with the membrane polymer material cast onto the polysulfone layer. Various other materials and methods can be used to make the membrane sheet. Membrane sheet can be made that provides varying degrees of removal efficiency. Micro filtration membranes can typically remove material as small as about 0.1 micron, typical of bacteria and protozoa, or other contaminants of such size in industrial applications. Ultra filtration membranes can have pore sizes as small as about 0.01 micron and can remove, as an example, viruses from fluid sources. Nano filtration membranes can have pore sizes small enough to remove di-valent ions, but will pass monovalent ions such as sodium and chloride. An example of application of nano filtration is water softening to remove, as an example, calcium carbonate. Reverse osmosis is typically the smallest pore size, and is sufficient to remove mono-valent salts, typically used in desalination applications. Various configurations of these spacer features have been disclosed by Barger et al. and Bradford et al. PCT/US14/18813, incorporated herein by reference, discloses various methods and materials suitable for depositing spacing features on membrane sheets. Those methods and materials can be useful in implementing embodiments of the present invention.

Spacer features that are embossed or deposited directly on the membrane surface present differences during manufacture of spiral wound elements as compared to conventional mesh feed spacers. Spacer features can be made with a wider variety of shapes and patterns than can be achieved with an extruded or woven mesh material, and their spacing and orientation can likewise be widely varied. During the typical manufacture of a spiral wound filtration element using embossed or deposited features, sheets of membrane with features on one-half of the sheet are folded into leaves, one side containing features and the other side blank; both faces—now opposed to each other—are active membrane surface. The spacers allow a feed solution to flow between the active membrane surfaces so that all active surfaces of the membrane are available for filtration. Interleaved on the outside of these two membrane sheets are sheets of permeate carrier. Fluids flowing through the active membrane sheet come in contact with the permeate carrier and the fluid in the permeate carrier is transported to the center tube. Adhesive is applied before being rolled around the center tube to create the finished element. A line of adhesive is deposited starting at one end of the center tube either onto the back (inactive) side of the folded membrane leaf or onto the permeate carrier mesh above said leaf, around three sides of the perimeter of this sheet and back into contact with the center tube. The glue line serves to seal and isolate the permeate carrier from the feed/reject flow. This process is repeated on each leaf used to create the element.

The printed features are particularly important at the inlet and outlet areas of a spiral-wound element, where the area between the features creates spacing through which feed water flows into and reject water flows out of the element, and where they must resist the forces generated by the compression of the viscous adhesive line during element rolling. If the printed features are merely a regularly spaced repeating pattern of lines, line segments, or posts, they may allow the adjacent membrane sheet to deform into the feed space during rolling due to force on the adhesive and occlude the flow channel. Similarly, some patterns and spacing of features can allow for the entire adjacent layer of membrane, permeate carrier and adhesive to deform to nest between features.

Example embodiments of the present invention can prevent occlusion of the feed channel during spiral wound element manufacture by providing feature spacing and patterns that prevent collapse and deformation of the membrane film and adjacent layers. Additionally, by providing additional support to the membrane sheet during rolling and preventing nesting, example embodiments of the present invention can discourage occlusion of the feed channel without requiring changes to the standard processes used to roll spiral wound elements.

An advantage of embodiments of the present invention is that reducing occlusion of the feed space between layers of a spiral wound element reduces resistance to flow and thus pressure drop from the inlet to the outlet of the element, which improves the efficiency of filtration and reduces energy requirements.

Example embodiments of the present invention can also provide advantages by facilitating more uniform flow throughout the element and preventing potential fouling due to non-uniform flow. If some segments of the feed space are unevenly occluded, as can be caused by nesting of adjacent layers between conventional features, uneven flow can occur within the element. Uneven flow is known to create stagnation points that allow for biological fouling and scale deposition.

Figure 1:
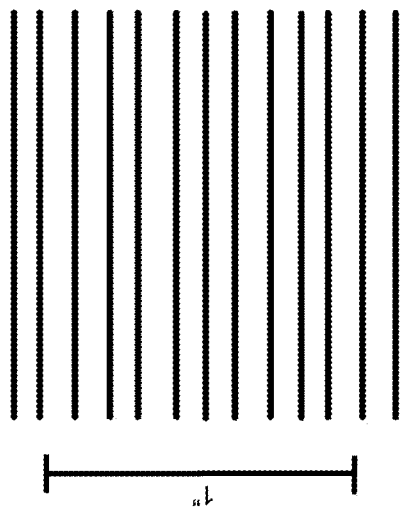
FIG. 1 is an illustration of an array of parallel line segments with spacing varied to prevent nesting during rolling of a spiral-wound element.

Referring to FIG. 1, in one example embodiment of the present invention, rather than uniform spacing between adjacent features, the spacing between adjacent features is varied slightly in the direction perpendicular to cross-flow in the element. This varied spacing can be periodic, with set varied spacing occurring regularly, with a longer period generally producing less chance of nesting. In some spiral-wound element configurations, preferably the period before the pattern repeats is at least 6 inches (6") and more preferably the period is at least twelve inches (12"). In some spiral-wound element configurations, preferably the variation in spacing is less than 15% of the average distance between adjacent features in order to not significantly effect flow characteristics through the element. The variation in feature spacing reduces the potential for pattern nesting between consecutive layers in the spiral wound element.

Referring to FIG. 2, in another example embodiment of the present invention, an array of line segments providing spacer features have their angles from mutual parallelism varied slightly with respect to one another. This variation in angle can be periodic, with set varied angles occurring regularly, with a longer period generally producing less chance of nesting. In some spiral-wound element configurations, preferably the period before the pattern repeats is at least 6 inches (6") and more preferably the period is at least twelve inches (12"). In some spiral-wound element configurations, preferably the variation in angle is less than 15% from the average angle of the overall spacer feature array in order to not significantly effect flow characteristics through the element. The variation in feature angle reduces the potential for pattern nesting between consecutive layers in the spiral wound element.

Figure 4B:
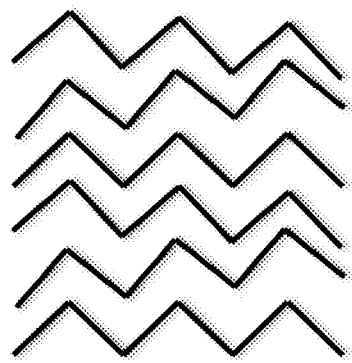
FIG. 4A, B, C, D comprise illustrations of further example feature embodiments.
Figure 4D:
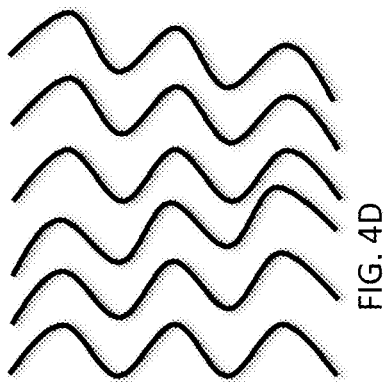
Figure 4A:
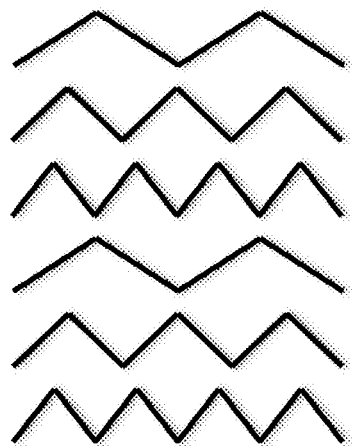
Figure 4C:
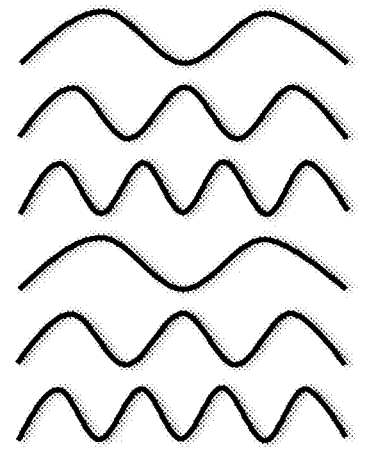

Similarly, variation of features or relative angles can be practiced on other shapes such as curves, or zigzag patterned features can be arrayed with periodic varying angles in order to prevent nesting of consecutive layers as well. Examples of such variations are illustrated in FIG. 4: FIG. 4a is an illustration of zigzag patterns with varying internal angle from feature to feature; FIG. 4B is an illustration of similar zigzag elements disposed non-parallel to each other. FIG. 4C is an illustration of curved features with varying curve shape from feature to feature; FIG. 4D is an illustration of curved features with similar shapes but disposed non-parallel to each other. While the spacing between features in FIG. 4 is illustrated as consistent, the features can also be disposed with varying spacing between features, similar to those in FIG. 1. The present invention contemplates a variety of such feature shapes and configurations, each providing features such that features at least partly support those on adjacent layers as the element is rolled and glued.

Spiral wound elements using conventional extruded mesh spacers generally do not have issues with nesting of adjacent layers because the mesh filaments are spaced so closely that the filaments do not allow the membrane film or the entire layer of membrane, permeate carrier, and adhesive to deform and occlude the feed space. Typically, the largest mesh spacing is eight strands per inch, with ten to twelve strands per inch more common for large elements and more dense spacing for smaller elements. Consequently, the concern addressed by the current invention was not apparent until unconventional, deposited spacing features were deployed.

Figure 3C:
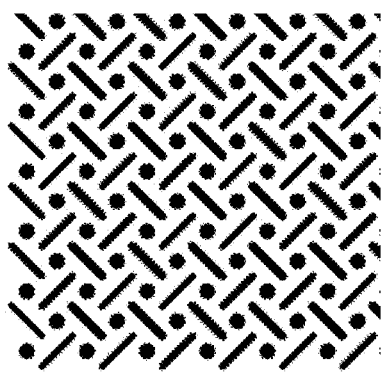
FIG. 3A, B, C comprise illustrations of several configurations of closely spaced patterns designed to prevent nesting during rolling of a spiral-wound element.
Figure 3B:
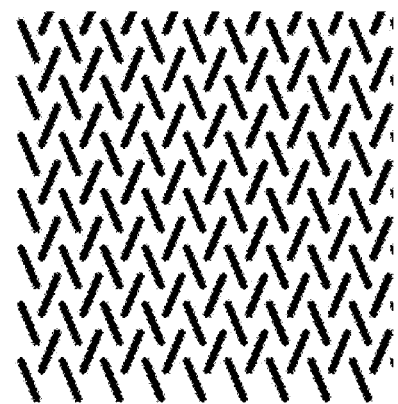
Figure 3A:
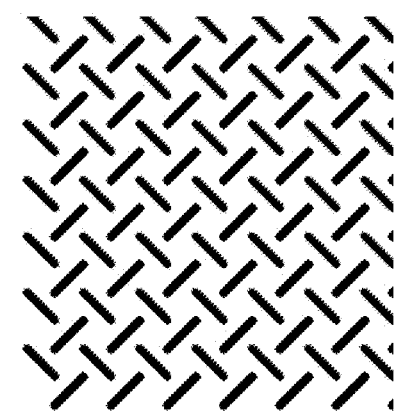

Referring to FIG. 3, further example embodiments of the current invention employ a pattern of embossed or deposited features which are similar in spacing to conventional mesh feed spacer and arranged in patterns that minimally impede feed flow. These features can be a regular array of shapes such as circular or polygonal posts, chevrons, curved line segments or other shapes, and can comprise an array of line segments offset from one another and set at two different angles from the direction of fluid cross-flow. These angles can be equal but opposite in direction, e.g. +45° and −45° (FIG. 3A), and can be of any angle from +/−1° to +/−45° (FIG. 3A, 3B). In some spiral-wound element configurations, preferably the maximum spacing of any part of these features to the nearest adjacent feature is less than or equal to one-quarter of one inch (0.25") and more preferably less than or equal to one-tenth of one inch (0.10"). In another embodiment the features comprise an array of offset and opposing angled line segments with round posts spaced in between the features (FIG. 3C). Such closely spaced features can be advantageous in that the features and the membrane sheet surrounding them become substantially less susceptible to deformation during the rolling process where the adhesive is in contact with the membrane film and thus it can be beneficial to have these densely spaced patterns along the perimeter of the membrane sheet where the adhesive is applied even when a less densely spaced pattern is employed elsewhere on the membrane sheet in order to reduce restriction to flow.

In each of the example embodiments, the features can be embossed or deposited in a continuous manner across the entirety of the printed surface of the membrane leaf; embossed or deposited only along the inlet and outlet edge sections of the membrane, for example at a width of one to three inches, in order to support the area where adhesive is applied; or embossed or deposited only along the inlet and outlet edge sections and end section of the membrane, for example at a width of one to three inches, in order to support the area where adhesive is applied in all areas.

The features can comprise various materials that are compatible with the separated fluid and the permeate carrier including, but not limited to, thermoplastics, reactive polymers, waxes, or resins. Additionally, materials that are compatible with the separated fluid but not compatible with direct deposition to the permeate carrier, including, but not limited to high-temperature thermoplastics, metals, or ceramics, can be pre-formed, cast, or cut to the proper dimensions and adhered to the surface of the permeate carrier with an adhesive that is compatible with the permeate carrier.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:

1. A membrane for use in a spiral wound permeable membrane system, comprising a membrane having spacing features disposed on a surface of the membrane, wherein the spacing features are more closely spaced near the edges of the membrane than in portions of the membrane distant from the edges.

2. A membrane as in claim 1, wherein the edges of the membrane are defined as the region within three inches of the edge of the membrane.

3. A membrane as in claim 2, wherein the edges of the membrane are defined as the region within one inch of the edge of the membrane.

4. A membrane as in claim 1, wherein the spacing features are made of one or more of thermoplastics, reactive polymers, waxes, and resins, deposited directly onto the membrane surface.

5. A membrane as in claim 1, wherein the spacing features are made of one or more of high-temperature thermoplastics, metals, and ceramics, formed apart from the membrane surface and then adhered to the membrane surface.

6. A membrane as in claim 1, wherein the spacing features comprise a plurality of substantially parallel line segments spaced apart from each other by nonuniform spacing distances.

7. A membrane as in claim 6, wherein a first subset of the plurality of substantially parallel line segments comprises substantially parallel line segments that are adjacent to and spaced apart from each other by nonuniform spacing distances thereby forming a pattern, and wherein other subsets of the plurality of substantially parallel line segments comprise repeats of the pattern.

8. A membrane as in claim 7, wherein the pattern extends a distance of at least 6 inches, measured perpendicular to the line segments, from a first line segment at a first end of the pattern to a a second line segment at a second end, opposite the first end, of the pattern.

9. A membrane as in claim 8, wherein the distance is at least 12 inches.

10. A membrane as in claim 7, wherein the nonuniform spacing distances have an average distance, and wherein each of the nonuniform spacing distances differs from the average distance by less than 15% of the average distance.

11. A membrane as in claim 1, wherein the spacing features comprise a plurality of line segments spaced apart from each other and oriented non-parallel to each other at nonuniform angles.

12. A membrane as in claim 11, wherein a first subset of the plurality of line segments comprises line segments that are adjacent to and oriented relative to each other at nonuniform angles thereby forming a pattern, and wherein other subsets of the plurality of line segments comprise repeats of the pattern.

13. A membrane as in claim 12, wherein the pattern extends for a distance of at least 6 inches measured from an end of a first line segment at a first end of the pattern to a corresponding end of a second line segment at a second end, opposite the first end, of the pattern.

14. A membrane as in claim 13, wherein the distance is at least 12 inches.

15. A membrane as in claim 12, wherein the nonuniform angles have an average angle, and wherein each of the angles differs from the average angle by less than 15% of the average angle.

16. A membrane as in claim 1, wherein the spacing features comprise a plurality of curved segments that are spaced apart from each other by nonuniform spacing distances determined along at least one path traversing the spacing features.

* * * * *